US012775652B2

(12) United States Patent
Xie et al.

(10) Patent No.: US 12,775,652 B2
(45) Date of Patent: Oct. 27, 2026

(54) APPARATUS, METHOD AND STORAGE MEDIUM FOR DATA QUERY USING SIMILARITY BETWEEN A QUERY REQUEST AND AUDIO AND/OR VIDEO FILES

(71) Applicant: ZILLIZ INC., Redwood City, CA (US)

(72) Inventors: Chao Xie, Redwood City, CA (US); Anyang Wang, Shanghai (CN); Yuchen Gao, Shanghai (CN); Rentong Guo, Shanghai (CN)

(73) Assignee: ZILLIZ INC., Redwood City, CA (US)

( * ) Notice: Subject to any disclaimer, the term of this patent is extended or adjusted under 35 U.S.C. 154(b) by 663 days.

(21) Appl. No.: 18/190,652

(22) Filed: Mar. 27, 2023

(65) Prior Publication Data

US 2024/0330341 A1 Oct. 3, 2024

(51) Int. Cl.

| | |
|---|---|
| ***G06F 16/334*** | (2025.01) |
| ***G06F 16/33*** | (2025.01) |
| ***G06F 16/3329*** | (2025.01) |
| ***G06F 16/3332*** | (2025.01) |
| ***G06F 40/40*** | (2020.01) |

(52) U.S. Cl.

CPC ...... *G06F 16/3347* (2019.01); *G06F 16/3338* (2019.01); *G06F 16/3344* (2019.01); *G06F 40/40* (2020.01)

(58) Field of Classification Search

CPC ................. G06F 16/3329; G06F 16/33; G06F 16/3347; G06F 40/247

See application file for complete search history.

(56) References Cited

U.S. PATENT DOCUMENTS

2019/0095429 A1* 3/2019 Fan ........................ G06F 40/247
2024/0248920 A1* 7/2024 Qiao ................... G06F 16/3329

FOREIGN PATENT DOCUMENTS

CN 112052312 A * 12/2020 ........... G06F 16/332
CN 110059172 B 9/2021
CN 114357120 A * 4/2022 ............. G06F 16/33
CN 115114424 A 9/2022

OTHER PUBLICATIONS

Burke et al. ("AI Magazine vol. 18 No. 2 (1997)" p. 57+ "Question Answering from Frequently Asked Question Files".*

* cited by examiner

*Primary Examiner* — Farzad Kazeminezhad

(74) *Attorney, Agent, or Firm* — Kim IP Law Group LLC

(57) ABSTRACT

Apparatus, method and storage medium for data query is disclosed. One or more domain-related question-answering pairs, files, and summary information of each file may be pre-stored in a vector database. When receiving the query request from the user, the question-answering system first obtains the associated data of the received query request from the vector database, and the associated data includes the associated question-answering pair and the associated summary information corresponding to the query request. Then, the question-answering system inputs the associated data and the query request into the large language model to obtain an intermediate query result. Finally, if there is summary information matching the intermediate query result in the associated summary information, the file corresponding to the matched summary information is added to the intermediate query result to obtain the query result corresponding to the query request.

17 Claims, 6 Drawing Sheets

APPARATUS, METHOD AND STORAGE MEDIUM FOR DATA QUERY USING SIMILARITY BETWEEN A QUERY REQUEST AND AUDIO AND/OR VIDEO FILES

TECHNICAL FIELD

The disclosure relates in general to the field of computers, and more particularly, to an apparatus, method, and storage medium for data query.

BACKGROUND

With the development of artificial intelligence technology, deep learning models, in particular LLM (large language model), are increasingly used in QAS (question-answering system). LLM is obtained by learning the structure, rules and semantics of one or more language in a large amount of text data, and an answer having a natural language style (hereinafter referred to as a query result) can be inferred based on an input question or dialogue (hereinafter referred to as a query request). However, if the training data used in training the LLM does not include data related to a query result corresponding to a query request, the LLM may inference to obtain an incorrect query result after inputting the query request to the LLM.

To this end, in some scenarios, the query request and the associated data corresponding to the query request may be inputted into the LLM at the same time. So that the LLM can derive the query result of the query request based on the inputted associated data. However, the amount of data of the associated data that the LLM can support is generally small, resulting in low accuracy and single result form of the query result obtained based on the associated data, which affects the user's experience of querying data.

SUMMARY

The following examples pertain to embodiments described throughout this disclosure.

One or more embodiments can include an apparatus. The apparatus includes a memory for storing instructions; and one or more processor for executing the instructions to perform following process: receiving a query request; determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database; inputting the query request and the associated data into a large language model so that the large language model outputs an intermediate query result of the query request based on the content of the associated data; determining the query result of the query request based on the intermediate query result and summary information of the one or more files in the associated data.

One or more embodiments can include an apparatus, wherein determining the query result of the query request based on the intermediate query result and summary information of the one or more files in the associated data, comprising: when one or more summary information in the summary information of the one or more files matching the intermediate query result, adding the files corresponding to the one or more summary information to the intermediate query result to obtain the query result of the query request.

One or more embodiments can include an apparatus, wherein the at least one file comprising at least one of audio, video, pictures, tables, documents and web pages.

One or more embodiments can include an apparatus, wherein the association data further comprising at least one historical query request preceding the query request and the query result corresponding to the at least one historical query request.

One or more embodiments can include an apparatus, wherein determining associated data of the query request, comprising: determining a first number of question-answering pairs in the plurality of question-answering pairs that associated with the vector corresponding to the query request, and a second number of summary information in summary information of the plurality of files that associated with the vector corresponding to the query request; determining the question-answering pair in the first number of question-answering pairs that satisfies a first condition as the one or more question-answering pair, and the summary information in the second number of summary information that satisfies a second condition as the summary information of one or more files.

One or more embodiments can include an apparatus, wherein the first condition comprising: the matching degree between the question-answering pair and the query request is greater than a first match degree; the second condition comprising: the matching degree between the summary information and the query request is greater than a second matching degree, and/or the information density of the summary information is greater than a preset value.

One or more embodiments can include an apparatus, wherein the summary information of the plurality of files is determined by the following ways: determining the summary information of text file by extracting summary from the text in text file; determining the summary information of non-text file by extracting summary from the text description of the non-text file.

One or more embodiments can include an apparatus, wherein the large language model comprising any one of the following models: ChatGPT, GPT-1, GPT-2, GPT-3, GPT-4, BERT and XLNet.

One or more embodiments can include a method performed by at least one processor of electronic device. The method includes: receiving a query request; determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database; inputting the query request and the associated data into a large language model so that the large language model outputs an intermediate query result of the query request based on the content of the associated data; determining the query result of the query request based on the intermediate query result and summary information of the one or more files in the associated data.

One or more embodiments can include a method, wherein determining the query result of the query request based on the intermediate query result and summary information of the one or more files in the associated data, comprising: when one or more summary information in the summary information of the one or more files matching the intermediate query result, adding the files corresponding to the one or more summary information to the intermediate query result to obtain the query result of the query request.

One or more embodiments can include a method, wherein the at least one file comprising at least one of audio, video, pictures, tables, documents and web pages.

One or more embodiments can include a method, wherein the association data further comprising at least one historical query request preceding the query request and the query result corresponding to the at least one historical query request.

One or more embodiments can include a method, wherein determining associated data of the query request comprising: determining a first number of question-answering pairs in the plurality of question-answering pairs that associated with the vector corresponding to the query request, and a second number of summary information in summary information of the plurality of files that associated with the vector corresponding to the query request; determining the question-answering pair in the first number of question-answering pairs that satisfies a first condition as the one or more question-answering pair, and the summary information in the second number of summary information that satisfies a second condition as the summary information of one or more files.

One or more embodiments can include a computer-readable storage medium having stored thereon instructions that, when executed on an electronic device, cause the electronic device to perform following process: receiving a query request; determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database; inputting the query request and the associated data into a large language model so that the large language model outputs an intermediate query result of the query request based on the content of the associated data; determining the query result of the query request based on the intermediate query result and summary information of the one or more files in the associated data.

One or more embodiments can include a computer-readable storage medium, wherein: determining the query result of the query request based on the intermediate query result and summary information of the one or more files in the associated data, comprising: when one or more summary information in the summary information of the one or more files matching the intermediate query result, adding the files corresponding to the one or more summary information to the intermediate query result to obtain the query result of the query request.

One or more embodiments can include a computer-readable storage medium, wherein: the at least one file comprising at least one of audio, video, pictures, tables, documents and web pages.

One or more embodiments can include a computer-readable storage medium, wherein: the association data further comprising at least one historical query request preceding the query request and the query result corresponding to the at least one historical query request.

One or more embodiments can include a computer-readable storage medium, wherein determining associated data of the query request, comprising: determining a first number of question-answering pairs in the plurality of question-answering pairs that associated with the vector corresponding to the query request, and a second number of summary information in summary information of the plurality of files that associated with the vector corresponding to the query request; determining the question-answering pair in the first number of question-answering pairs that satisfies a first condition as the one or more question-answering pair, and the summary information in the second number of summary information that satisfies a second condition as the summary information of one or more files.

One or more embodiments can include a computer-readable storage medium, wherein the first condition comprising: the matching degree between the question-answering pair and the query request is greater than a first match degree; the second condition comprising: the matching degree between the summary information and the query request is greater than a second matching degree, and/or the information density of the summary information is greater than a preset value.

One or more embodiments can include a computer-readable storage medium, wherein the large language model comprising any one of the following models: ChatGPT, GPT-1, GPT-2, GPT-3, GPT-4, BERT and XLNet.

BRIEF DESCRIPTION OF THE FIGURES

The foregoing summary, as well as the following detailed description of the exemplary embodiments, will be better understood when read in conjunction with the appended drawings. For the purpose of illustrating the present disclosure, there are shown in the drawings embodiments, which are presently preferred. It will be understood, however, that the present disclosure is not limited to the precise arrangements and instrumentalities shown.

In the drawings.

DETAILED DESCRIPTION

Figure 1:
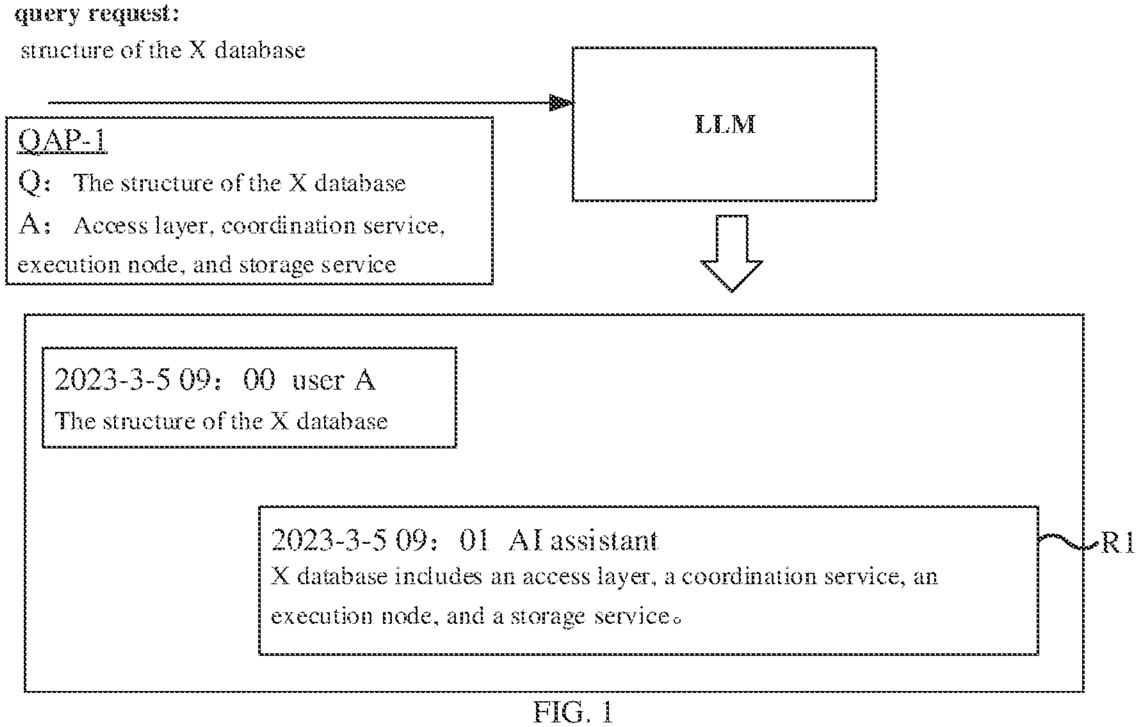
FIG. 1 shows a s a schematic diagram of inferring an answer to a query request through a large language model according to some embodiments of the present disclosure.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

Illustrative embodiments of the present disclosure include, but are not limited to, an apparatus, method, and storage medium for database queries of pagination.

It will be appreciated that the LLM mentioned in the various embodiments of the present disclosure may be any large language model capable of inferring the query result corresponding to the query request based on the query request input to the LLM and the associated data with the query request based on the input associated data, including but not limited to ChatGPT (chat generative pre-trained transformer), GPT (generative pre-training)-1, GPT-2, GPT-3, GPT-4, BERT (bidirectional encoder representation from transformers), XLNet, and the like. For ease of description, ChatGPT is adopt as an example of LLM in the description below.

As previously described, in some scenarios, a query request and associated data (as prompt) with the query request may be simultaneously entered into the ChatGPT. So that the ChatGPT may derive the query result of the query request based on the entered associated data. However, the amount of data of the associated data that the ChatGPT can support input is generally small, resulting in a low accuracy and single result form in the query result obtained based on the associated data, which affects the user's experience of querying the data.

For example, assume that a QAS is based on a large language model (e.g., ChatGPT) that is trained without related data about X database. Referring to FIG. 1, in some scenarios, the query request "structure of the X database" and associated data (QAP (question-answering pair)-1) can be input to the ChatGPT in order to get the answer of the query request. Wherein, the question in QAP-1 is "The structure of the X database", and the answer is "Access layer, coordination service, worker node, and storage service".

After receiving the query request and the associated data (QAP-1), the ChatGPT can infer that the query result R1 "X database includes an access layer, a coordination service, an worker node, and a storage service". However, since the size of the associated data supported by the ChatGPT is limited, the QAP-1 can be input into the ChatGPT model as associated data, while pictures, audio, video, web pages or other forms of files associated with the structure of the X database cannot be input into the ChatGPT, resulting in a simple and low accuracy query result given by the ChatGPT, which affects the user experience.

It can be understood that prompt is a type of input data defined by the large language model. When a query request is input to the large language model together with prompt, the large language model may inference the query request according to prompt, so that the inferred query result is related to prompt. That is, after the input of the prompt, the large language model deduces the query result corresponding to the query request based on the content in the prompt.

It will be appreciated that QAP is data stored in correspondence of questions and answers, one question may correspond to one or more answers.

In view of the above, an embodiment of the present disclosure provides a data query method, which is applied to a QAS including a large language model. In the method, QAPs, files, and the summary information of each file involved in one or more fields can be pre-stored in a vector database. Upon receiving a query request from a user, the QAS first obtains associated data of the received query request from the vector database, the associated data including at least one QAP associated with the query request (hereinafter referred to as associated QAP), and summary information of at least one file associated with the query request (hereinafter referred to as associated summary information).

Then, the QAS inputs the associated data of the query request into the large language model to obtain the intermediate query result. Finally, if there is summary information matching the intermediate query result in the associated summary information, the file corresponding to the matched summary information is added to the intermediate query result to obtain the query result corresponding to the query request.

Thus, since the files associated with the query request are input into the large language model in the form of summary information, more data associated with the query request can be input into the large language model when the large language model has a limit on the size of the associated data. Thereby, the accuracy of the intermediate query result inferred from the large language model is improved. In addition, when the summary information matching the intermediate query result exists in the associated summary information, a file corresponding to the matched summary information may be added to the intermediate query result to obtain a query result corresponding to the query request, and a data type included in the query result obtained by the QAS is added, which is beneficial to improving user experience.

Figure 2:
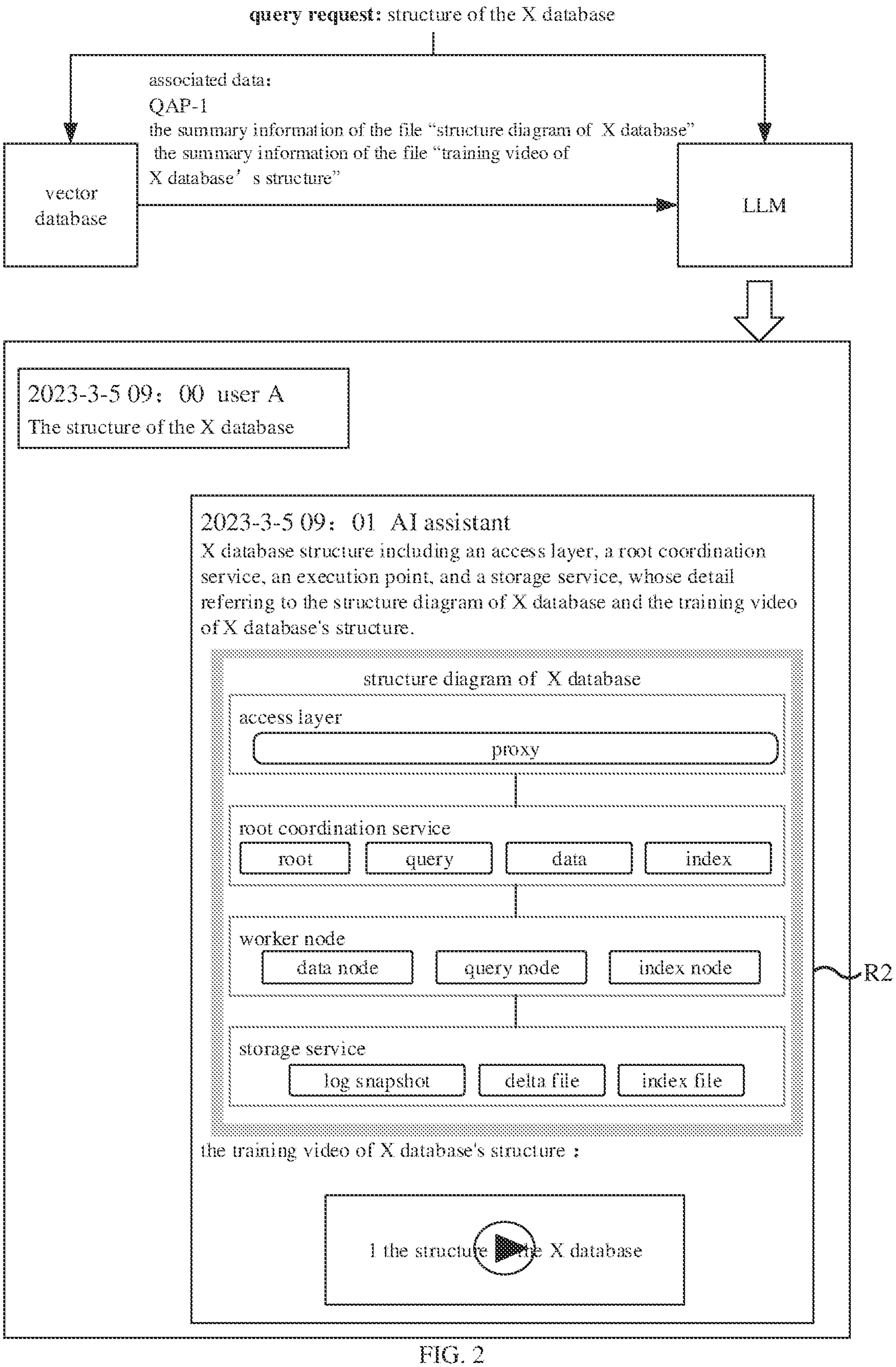
FIG. 2 shows another schematic diagram of inferring an answer to a query request through a large language model embodiments of the present disclosure.

For example, referring to FIG. 2, in the case shown in FIG. 1, the query request "structure of the X database" may first be used to query, from the vector database, the associated data such as associated QAPs (for example, the foregoing QAP-1), the summary information of the file "structure diagram of X database" and the summary information of the file "training video of X database's structure".

The associated data is then input into the large language model to obtain an intermediate query result "X database structure including an access layer, a root coordination service, an execution point, and a storage service, whose detail referring to the structure diagram of X database and the training video of X database's structure".

Then, summary information of the file "structure diagram of X database" and the summary information of the file "training video of X database's structure" are determined to match the intermediate query result. Hence the query result R2 can be obtained by adding the file "structure diagram of X database" and the file "training video of X database's structure" to the intermediate query result.

Compared with the query result R1 shown in FIG. 1, the query result R2 includes not only a text description of the structure of the X database, but also a structure diagram of the X database and a training video of X database's structure. The result is more accurate and rich, which is beneficial to improving the user experience of querying data.

The technical solution of the present disclosure is described below in connection with the structure of a specific QAS.

Figure 3:
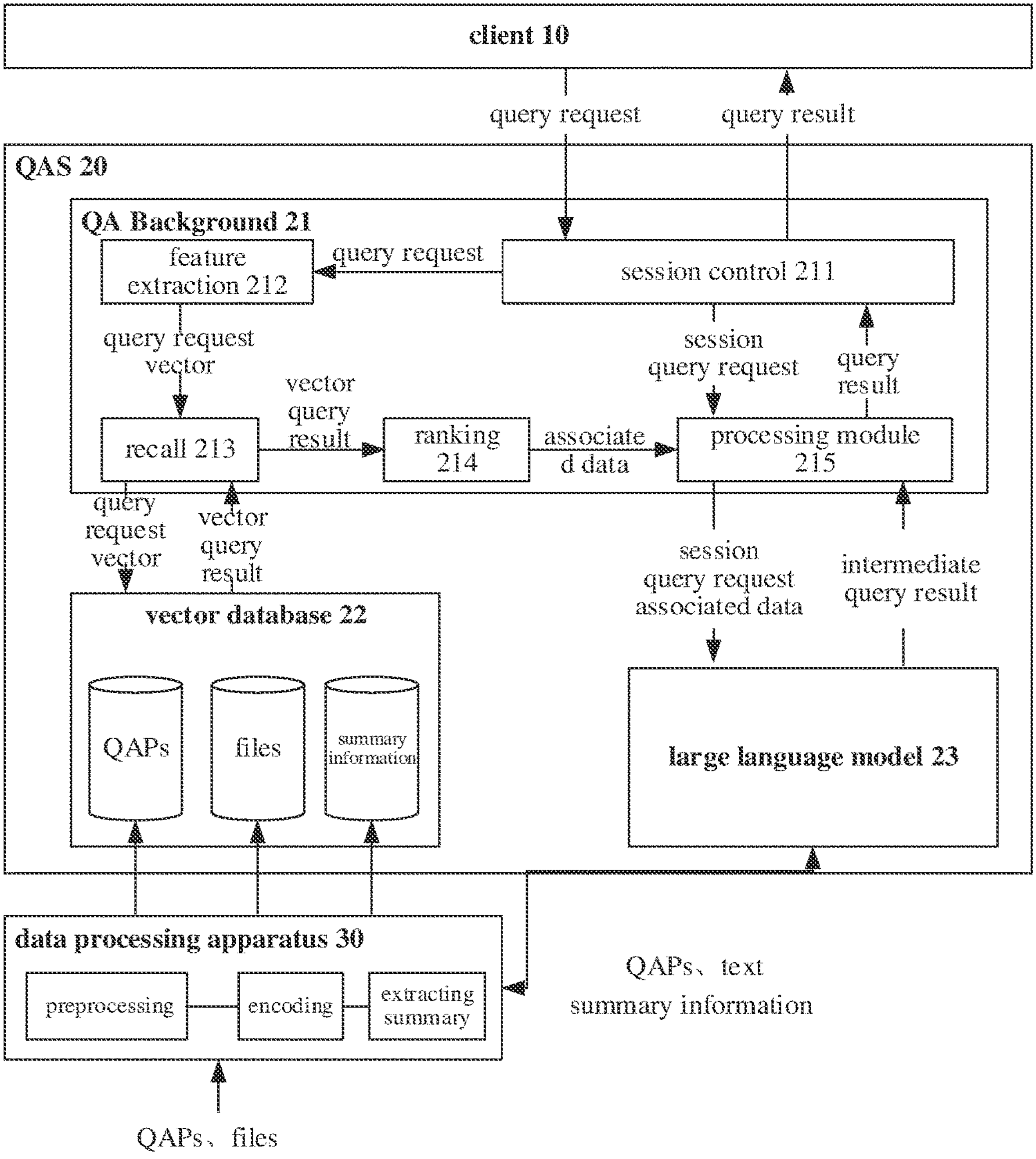
FIG. 3 shows schematic structural diagram of a question answering system 20 according to some embodiments of the present disclosure.

Specifically, FIG. 3 shows a schematic structural diagram of a QAS 20 according to some embodiments of the present disclosure.

As shown in FIG. 3, the QAS 20 includes a QA (question-and-answer) background 21, a vector database 22, and a large language model 23.

The QA background 21 includes a session control 211, a feature extraction 212, a recall 213, ranking 214, and a processing module 215.

The session control 211 is configured to receive a query request sent by a user from the client 10, forward the query request to the feature extraction 212, forward the query request and session information to the processing module 215, and forward the query result received from the processing module 215 to the client 10.

In some embodiments, questions entered by the user may be included in the query request.

In some embodiments, the session information may include context information of a question entered by a user in a query request (e.g., one or more questions prior to the question entered by the user, and query results of the partial question), a time stamp of the session, and the like.

The feature extraction 212 is configured to perform feature extraction on the problem input by a user in a query request, obtain a corresponding vector representation of the problem input by the user, extract a keyword for the problem input by the user, obtain a problem label corresponding to the problem input by the user (hereinafter, the vector representation corresponding to the problem input by the user and the vector corresponding to the problem label are referred to as a query request vector), and send the query request vector to the recall 213.

The recall 213 is configured to query a vector query result corresponding to the query request vector from the vector database 22 according to the query request vector, and forwarding the vector query result to the ranking 214. In some embodiments, the vector query results may include QAPs associated with the query request and summary information of the file associated with the query request stored in the vector database 22.

The ranking 214 is configured to sort, deduplicate and filter the QAPs and the summary information in the vector query result to obtain the QAPs and the summary information that satisfy the preset conditions. The ranking 214 is also used to forward the QAPs (as associated QAPs) and the summary information (as associated summary information) satisfying the preset conditions as associated data to the processing module 215. That is, the association data may include at least one QAP (association question-answering pair) associated with the query request and summary information of at least one file associated with the query request (association summary information).

The processing module 215 is configured to transmit the session information sent by the session control 211, the query request, the association data sent by the ranking 214 to the large language model 23, and to receive the intermediate query result corresponding to the query request from the large language model 23. The processing module 215 is further configured to determine whether there is summary information matching the intermediate query result in the associated summary information after receiving the intermediate query result. If there is summary information matching the intermediate query result in the associated summary information, the processing module 215 may add the file corresponding to the matched summary information to the intermediate query result to obtain a query result corresponding to the query request, and send the query result to the session control 211.

The vector database 22 is used to store QAPs of one or more domains, files, and summary information of files.

It will be appreciated that in some embodiments, the answers in the QAP may also be stored by the summary information to avoid that the answer in the QAP is too long to cause the associated data input to the large language model 23 to exceed the limits of the large language model 23.

It will be appreciated that in some embodiments, the summary information of the file may also be included in the answers in the QAP.

It will be appreciated that in some embodiments, the QAPs, the summary information of the file may be extracted by the data processing apparatus 30. For example, a QAP, a file (e.g., a document, a picture, an audio, a video, etc.) may be input to the data processing apparatus 30, which converts a file in a certain field into a vector to be stored in the vector database 22 by data preprocessing, data encoding, and extracting summary information.

It will be appreciated that, in some embodiments, the text may be converted into a uniform text paragraph by deformatting when the data processing device 30 performs data preprocessing on the text. In some embodiments, the text may be sliced when the text is too long to avoid excessively long text exceeding the input limits of the large language model 22 and the length limits of the model for data encoding the text.

It will be appreciated that, in some embodiments, data encoding refers to feature extraction of a text or summary of file resulting in a vector representation of the text or file.

It will be appreciated that in some embodiments, for text files, the summary may be extracted by NLP (natural language processing). For a non-text file, such as audio, video, or image, those files may be first converted into a text description, and then the text description is abstracted by NLP to obtain summary information of the non-text file.

It will be appreciated that in some embodiments, the summary information of the text file or the text description of the non-text file may also be extracted by the large language model 23. For example, in some embodiments, it is assumed that the text corresponding to the above "structure diagram of X database" is described as "the file is a structure diagram of X database including a multi-layer structure such as an access layer, a root coordination service, an execution point, a storage service, and the like. Wherein the access layer comprises . . . the storage services include . . . ". The summary information of the file "structure diagram of X database" may be obtained by inputting the following instruction in the ChatGPT: "Summarized the following test within 10 words: the file is a structure diagram of X database including a multi-layer structure such as an access layer, a root coordination service, an execution point, a storage service, and the like. Wherein the access layer comprises . . . the storage services include . . . ". After receiving the above instruction, the ChatGPT may obtain the summary information "structure diagram of the X database".

It will be appreciated that in some embodiments, for non-text files, a textual description of the non-text file may be generated by a pre-trained neural network model. For example, a textual description of a picture or video may be generated by a ERNIE-ViLG model. For another example, for audio or video file, speech in the audio or video may be first converted into text by a speech recognition model to obtain a textual description of the audio or video.

It will be appreciated that in other embodiments, the summary information of the file may be obtained by manual labeling or entry, or may be obtained by other means. The manner in which the summary information of the file is generated is not limited herein.

The large language model 23 is configured to obtain an intermediate query result corresponding to the query request based on the query request, the session information, and the associated data of the query request sent by the processing module 215. The large language model 23 may be any large language model, such as the aforementioned ChatGPT, GPT-1, GPT-2, GPT-3, GPT-4, BERT, XLNet, etc., and is not limited herein.

In the QAS 20, after receiving the query request, the session control 211 may send the query request to the feature extraction 212, and send the query request and the session information corresponding to the query request to the processing module 215. The query request vector corresponding to the query request is then obtained from the feature extraction 212, and a vector query result corresponding to the query request vector is obtained from the vector database 22 based on the query request vector by the recall 213.

Next, the QAPs associated with the query request and the summary information of the file in the vector query result are screened, deduplicated and sorted by the ranking 214 to obtain at least one QAP (associated QAP) and the summary information (associated summary information) of the at least one file that satisfy the preset condition.

Again, the processing module 215 forwards the query request, the session information corresponding to the query request, and the associated data corresponding to the query request to the large language model 23, and the large language model 23 deduces the intermediate query result corresponding to the query request.

Finally, when the summary information matching the intermediate query result exists in the associated summary information, the processing module 23 adds the file corresponding to the existing summary information to the intermediate query result to obtain the query result corresponding to the query request.

In the above process, since the file associated with the query request is input to the large language model 23 in the form of summary information, when the size of the associated data is constant, more data can be input to the large language model, which facilitates the accuracy of the intermediate query result obtained by the large language model 23. In addition, if the summary information matched with the intermediate query result exists in the summary information input to the large language model 23, a file corresponding to the matched summary information may be added to the intermediate query result to obtain the query result, which is beneficial to improving the richness of the query result and improving the user experience.

It will be appreciated that the various modules of the question-answering system 20 may be deployed in the same electronic device, such as a server, or in different servers, and the functions of the various modules in the question-answering system 20 may be implemented by the processors of the respective servers.

It will be appreciated that the configuration of the question-answering system 20 shown in FIG. 3 is merely an example, and in other embodiments, the question-answering system 20 may also include more or fewer modules, which are not limited herein.

The technical solution of the present disclosure will be described below based on the structure of the question-answering system 20 shown in FIG. 3.

Figure 4:
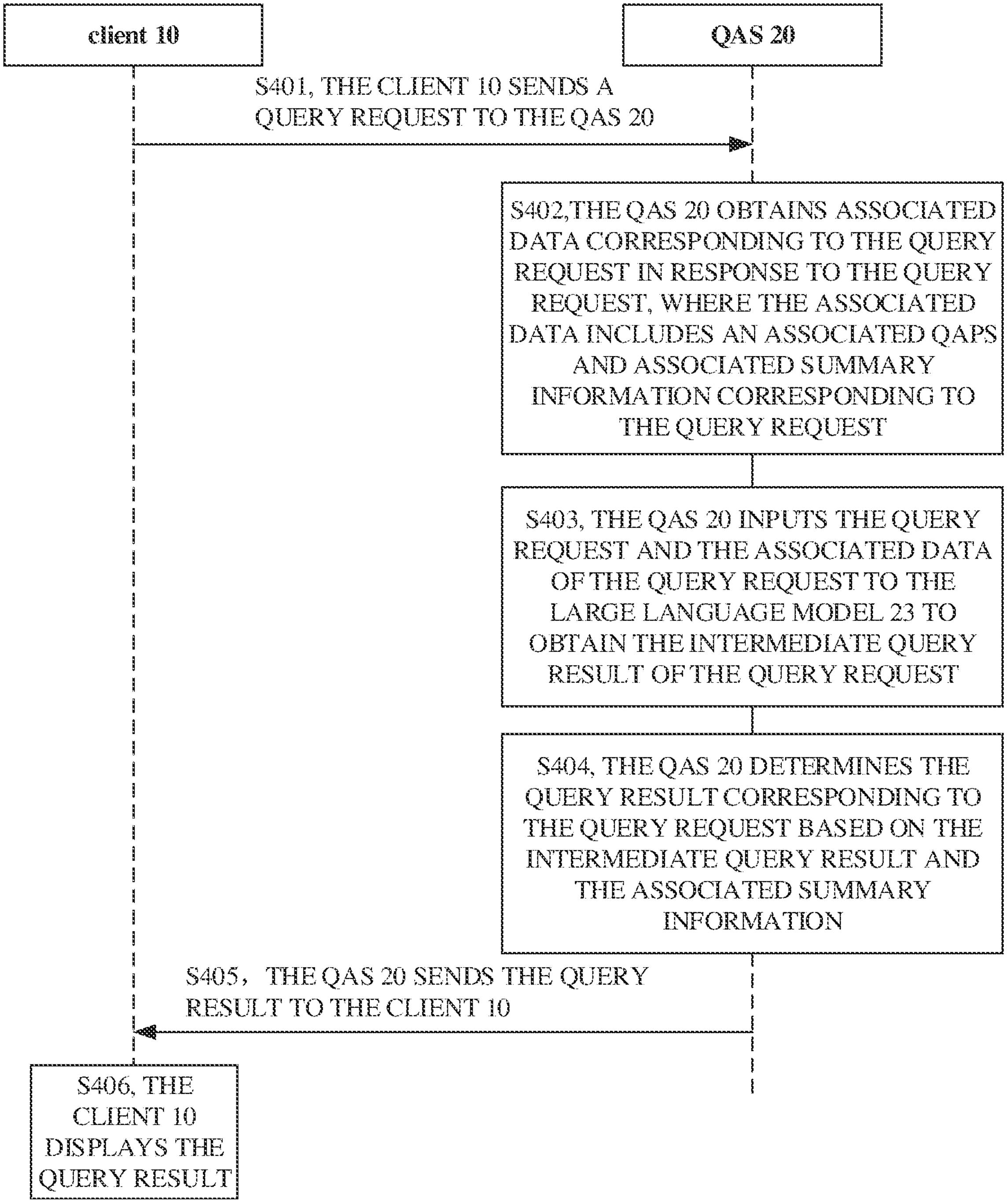
FIG. 4 shows a schematic diagram of an interaction flow of a data query method according to some embodiments of the present disclosure.

Specifically, FIG. 4 illustrates an interactive flow diagram of a data query method according to some embodiments of the present disclosure. While FIG. 4 illustrates various steps or stages in the method, additional steps or stages can be added and existing steps or stages can be reordered or removed. As shown in FIG. 4, the interaction flow includes the following steps.

In S401, the client 10 sends a query request to the QAS 20.

It will be appreciated that the client 10 may operate in the user's terminal device, and the user may send a query request to the server in which the session control 211 is located in the question-answering system 20 through the client 10, which query request may include a question input by the user.

Illustratively, for the case shown in FIG. 2, the query request may include the question entered by the user (the structure of X database).

It will be appreciated that in other embodiments, the client 10 may also send query requests to the QAS 20 in other forms, which are not limited herein.

In S402, the QAS 20 obtains associated data corresponding to the query request in response to the query request, where the associated data includes an associated QAPs and associated summary information corresponding to the query request.

The QAS 20 obtains associated data corresponding to the query request in response to the query request, wherein the associated data includes associated QAPs and associated summary information corresponding to the query request.

For example, the QAS 20 may obtain the associated data corresponding to the query request from the vector database 22 by using the server in which the question-answering background 21 is located.

It will be appreciated that the associated QAPs may include at least one QAP in the vector database 22 associated with a user-entered question in the query request.

It will be appreciated that the associated summary information may include summary information of at least one file in the vector database 22 associated with a user-entered question in the query request.

For example, when the session control 211 of the QAS 20 receives the query request, the session control 211 may first send the query request to the feature extraction 212, and the feature extraction 212 obtains the query request vector corresponding to the query request. Then, a vector query result corresponding to the query request vector is obtained from the vector database 22 based on the query request vector by the recall 213. Finally, the QAPs associated with the query request and the summary information of the file associated with the query request in the vector query result are screened, deduplicated and sorted by the ranking 214, and the at least one QAP and the summary information of the at least one file satisfying the preset condition are used as the associated data.

Illustratively, for the case shown in FIG. 2, the session control 211 may forward the question (structure of the X database) entered by the user in the query request to the feature extraction 212. The feature extraction 212 first extracts the keywords ("X database" and "structure"), and then assemble the keywords and the vector representation of the question (e.g., perform feature extraction) to obtain the query request vector corresponding to the query request.

Figure 5:
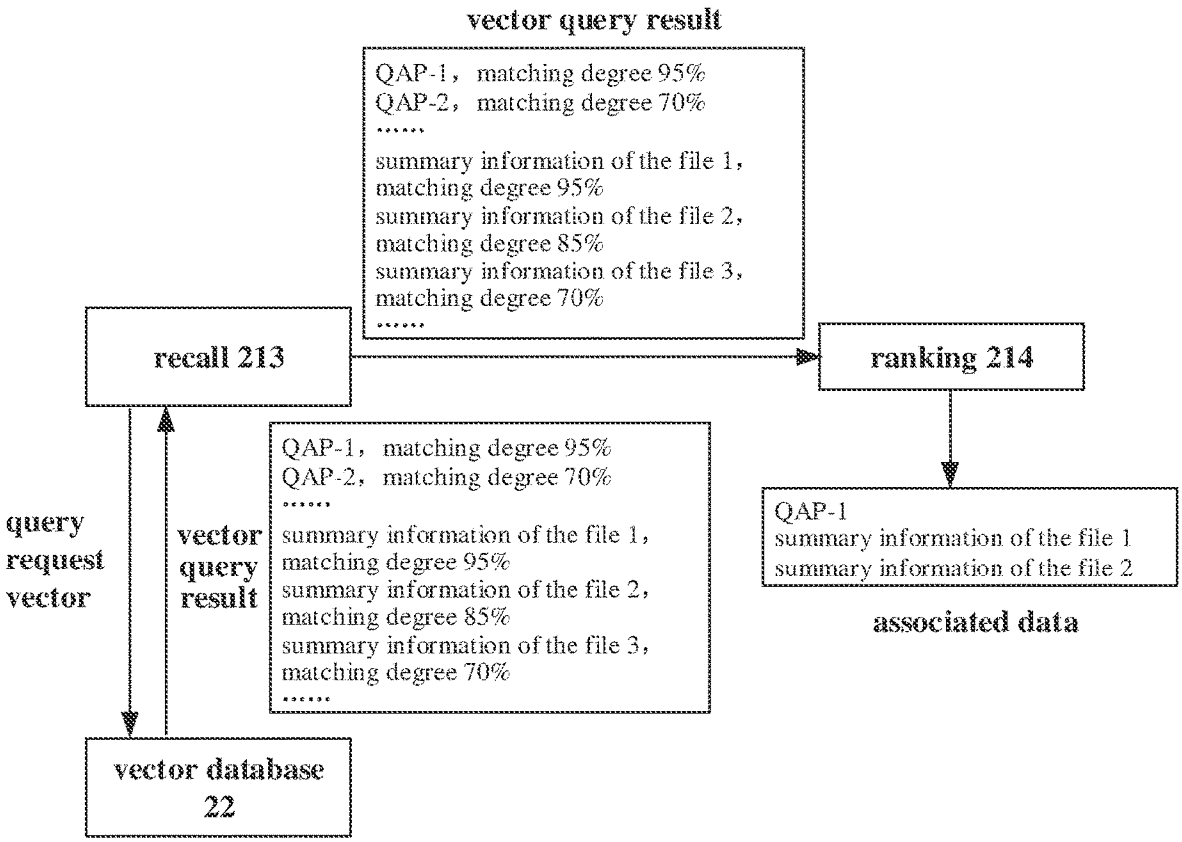
FIG. 5 shows a schematic diagram of determining associated data corresponding to a query request according to some embodiments of the present disclosure.

Then, referring to FIG. 5, the query request vector may be input to the vector database 22 by the recall 213 to obtain a vector query result corresponding to the query request vector in the vector database 22. The vector query result includes a first preset number of QAPs (QAP-1, QAP-2, . . . ) with the highest matching degree with the query request vector and a second preset number of summary information (summary information of the file 1, summary information of the file 2, summary information of the file 3, . . . ).

Next, referring to FIG. 5, it is determined by the ranking 214 that whether the matching degree between the QAPs or the summary information in the associated data and the query request satisfies a preset condition (For example, whether the matching degree is greater than a preset matching degree). And the question-answering pair and the summary information that satisfy the preset condition are adopt as the associated data.

For example, assuming that the preset matching degree may be 80%, since the matching degree of the QAP-1 is 95%, the matching degree of the QAP-2 is 70%, the matching degree of the summary information of the file 1 is 95%, the matching degree of the summary information of the file 2 is 85%, and the matching degree of the summary information of the file 3 is 70%, the ranking 214 may take the QAP-1, the summary information of the file 1, and the summary information of the file 2 as the associated data.

It will be appreciated that in some embodiments, QAP-1 may be the afore mentioned QAP (question: "Structure of the X database"; answer: "Access layer, root coordination service, execution point, and storage service"), file 1 may be the afore mentioned "structure diagram of X database", and file 2 may be the afore mentioned "training video of X database's structure".

It will be appreciated that the preset matching degree of 80% is merely an example, and other values, such as 75%, 70%, and the like, may be used in other implementations, and are not limited herein.

It will be appreciated that in some embodiments, the degree of matching between the QAP or summary information and the query request may be represented by the degree of similarity between the vector corresponding to the QAP or summary information and the query request vector, the higher the similarity, the greater the degree of matching. For example, the similarity between the QAP or the vector corresponding to the summary information and the query request vector may be represented by the distance between the vector corresponding to the QAP or the summary information and the query request vector.

It will be appreciated that in some embodiments, the preset conditions may include other conditions, such as the information density of the summary information (a ratio indicating the size of the summary information and the size of the file corresponding to the summary information, the smaller the ratio, the higher the information density) being greater than the preset information density.

It will be appreciated that in some embodiments, in the case where the sum of the magnitude of the QAP and the summary information satisfying the preset condition is larger than the magnitude defined by the large language model 23, partial data of the QAP and the summary information satisfying the preset condition who has the lowest degree of matching with the query request may also be deleted.

It will be appreciated that in some embodiments, if no QAP satisfies the preset condition, the association data may include only summary information that satisfies the preset condition. Similarly, in other embodiments, if no summary information satisfies the preset condition, the associated data may include only QAPs that satisfies the preset condition. It is not limited herein.

In S403, the QAS 20 inputs the query request and the associated data of the query request to the large language model 23 to obtain the intermediate query result of the query request.

After obtaining the associated data corresponding to the query request, the QAS 20 inputs the query request, the associated data corresponding to the query request (QAP-1, summary information of the file 1, and summary information of the file 2) into the large language model 23 to obtain the intermediate result "X database structure including an access layer, a root coordination service, an execution point, and a storage service, whose detail referring to the structure diagram of X database and the training video of X database's structure".

It will be appreciated that in some embodiments, the query request before the query request and the answer may also be input to the LLM 23 during the dialogue between the client 10 and the QAS 20 to improve the accuracy of the intermediate query results.

In S404, the QAS 20 determines the query result corresponding to the query request based on the intermediate query result and the associated summary information.

After obtaining the intermediate query result, the QAS 20 determines the query result corresponding to the query request based on the intermediate query result and the associated summary information. For example, when there is summary information matching the intermediate query result in the associated summary information, the QAS 20 may add the file corresponding to the matched summary information to the intermediate query result to obtain the query result.

Illustratively, for the case shown in FIG. 2, assume that the intermediate query result is "X database structure including an access layer, a root coordination service, an execution point, and a storage service, whose detail referring to the structure diagram of X database and the training video of X database's structure". The processing module 215 may determine that the intermediate query result matches the summary information of the file 1 and the summary information of the file 2, and add the file "structure diagram of X database" and the file "training video of X database's structure" to the intermediate query result to obtain the query result including the training video of X database's structure and the structure diagram of the X database.

It will be appreciated that in some embodiments, the intermediate query results may be matched with respective summary information in the associated summary information. If the degree of matching between a certain summary information with a certain part of the text in the intermediate query result is greater than a preset value, the summary information may be determined as summary information matching the intermediate query result. Thus, the processing module 215 may add the file corresponding to the summary information to the intermediate query result.

It will be appreciated that for different types of files, intermediate query results may be added to the file in different ways. For example, for audio or video, the play control of the audio or video and thumbnails may be added to the intermediate query results. For another example, for a file that the client cannot view directly, a thumbnail of the file may be added to the intermediate query result in a hyperlink manner. For another example, for a web page, a URL (uniform resource locator) address of the web page may be added to the intermediate query result.

It will be appreciated that in other embodiments, files may also be added to the intermediate query results by another way, and are not limited herein.

In S405, the QAS 20 sends the query result to the client 10.

After obtaining the query result, the QAS 20 sends the query result to the client 10.

It will be appreciated that the QAS 20 may transmit the text and files in the query result to the client 10 at the same time, or may transmit the link of files and text in the query result, which is not limited herein.

In S406, the client 10 displays the query result.

After receiving the query result, the client 10 displays the query result.

After receiving the query result, the client 10 may display the query result, for example, the query result R2 shown in FIG. 2.

According to the method provided in the embodiment of the present disclosure, the files associated with the query request are inputted into the large language model 23 in the form of summary information. When the size of the associated data is constant, more data can be inputted into the large language model, thereby improving the accuracy of the intermediate query result obtained by the large language model 23. In addition, if the summary information matched with the intermediate query result exists in the summary information input to the large language model 23, a file corresponding to the matched summary information may be added to the intermediate query result to obtain the query result, which is beneficial to improving the richness of the query result and improving the user experience.

It will be appreciated that steps S401 to S406 may be performed by the electronic device deployed by the client 10 and the question-answering system 20, for example, steps S401 and S406 may be performed by the terminal device deployed by the client 10, and steps S402 to S405 may be performed by the server deployed by the modules in the QAS 20.

Further, an embodiment of the present disclosure further provides a data query apparatus 600 including a query unit 601, a storage unit 602, and an inference unit 603.

The query unit 601 is configured to receive a query request from a user, obtain association data of the query request from the storage unit 602, obtain an intermediate query result from the inference unit 603 based on the query request and the association data, and obtain a query result of the query request based on the intermediate query result.

Illustratively, after receiving the query request from the user, the query unit 601 may first perform feature extraction and keyword extraction on the query request to obtain a query request vector corresponding to the query request. The query request vector is then sent to the storage unit 602 to obtain a vector query result corresponding to the query request vector in the storage unit 20. Next, the association information of the query request is obtained from the vector query result. Then, the query unit 601 may send the query request, session information corresponding to the query request, and associated data corresponding to the query request to the reasoning unit 603 to obtain an intermediate query result corresponding to the query request. When the summary information matching the intermediate query result exists in the summary information in the associated data, the query unit 601 adds the file corresponding to the matched summary information to the intermediate query result to obtain the query result corresponding to the query request.

The storage unit 602 is configured to store a question-answering pair of one or more fields, a file, and summary information of the file. In some embodiments, the storage unit 602 may be a vector database.

The inference unit 603 is configured to obtain an intermediate query result corresponding to the query request according to the query request input by the query unit 601, the session information corresponding to the query request, and the association data corresponding to the query request by the LLM. In some examples, LLM may be any of the foregoing ChatGPT, GPT-1, GPT-2, GPT-3, GPT-4, BERT and XLNet.

Figure 6:
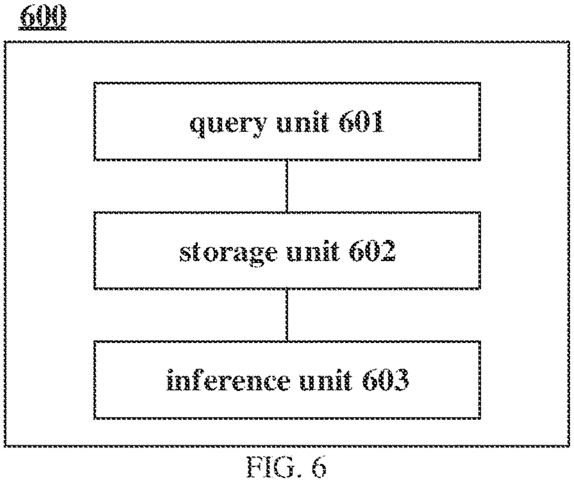
FIG. 6 shows a schematic structural diagram of a data query apparatus 600 according to some embodiments of the present disclosure.

It will be appreciated that the structure of the data query apparatus shown in FIG. 6 is merely an example, and in other embodiments, the data query apparatus 600 may also include more or fewer modules, and may also combine or split partial modules, which are not limited herein.

It will be appreciated that the various modules of the data query apparatus 600 may be deployed in the same or different electronic devices, and are not limited herein.

Figure 7:
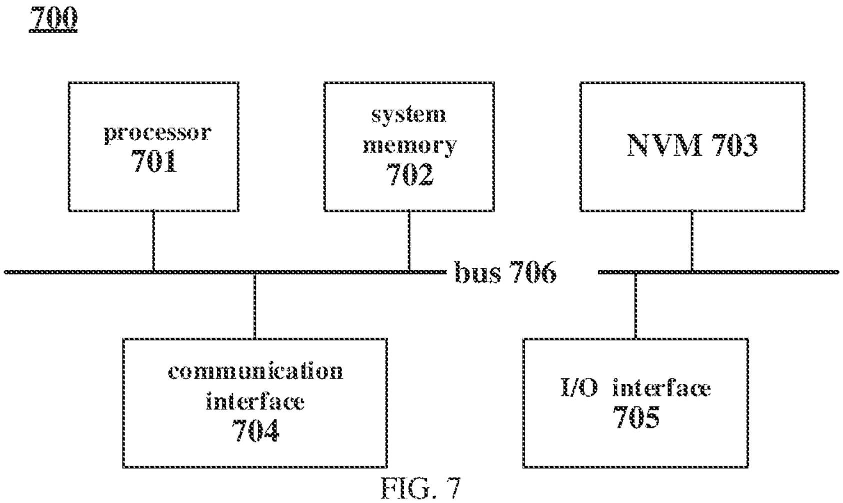
FIG. 7 shows a schematic structural diagram of an electronic device 700 according to some embodiments of the present disclosure.

Further, FIG. 7 shows a schematic structural diagram of an electronic device 700 according to some embodiments of the present disclosure. The electronic device 700 may be an electronic device that runs each module of the data query apparatus 600, or an electronic device that deploys each unit of the QAS 20.

As shown in FIG. 7, electronic device 700 may include one or more processors 701, a system memory 702, a NVM (non-volatile memory) 703, a communication interface 704, an input/output (T/O) interface 705, and a bus 706. Wherein:

The processor 701 may include one or more single-core or multi-core processors. In some embodiments, the processor

701 may include any combination of a general purpose processor and a special purpose processor (e.g., a graphics processor, an application processor, a baseband processor, etc.). In some embodiments, the processor 701 may execute instructions corresponding to the data query methods provided in the foregoing embodiments. For example, an instruction for generating a query request vector according to the query request, an instruction for obtaining a vector query result corresponding to the query request vector from the storage unit 603/vector database 22, an instruction for determining associated data of the query request from the vector query result, an instruction for obtaining an intermediate query result corresponding to the query request by the large language model 23/inference unit 603, an instruction for generating a query result of the query request based on the intermediate query result, and the like.

The system memory 702 is a volatile memory such as RAM (random-access memory), DDR SDRAM (double data rate synchronous dynamic random access memory), or the like. The system memory 702 is used to temporarily store data and/or instructions. For example, in some embodiments, the system memory 702 may be used to temporarily store instructions of the data query method provided in the foregoing embodiments, may be used to store a temporary copy of each data partition, or may be used to temporarily store vector query results, associated data, intermediate query results, query results corresponding to query requests, and the like.

Non-volatile memory 703 may include one or more tangible, non-transitory computer-readable media for storing data and/or instructions. In some embodiments, the nonvolatile memory 703 may include any suitable nonvolatile memory, such as flash memory, and/or any suitable non-volatile storage device, such as HDD (hard disk drive), CD (compact disc), DVD (digital versatile disc), SSD (solid-state drive), and the like. The non-volatile memory 703 may also be a removable storage medium, such as SD (secure digital) memory card. In some embodiments, the non-volatile memory 703 may be used to store instructions of the data query method provided in the foregoing embodiments, or may be used to store vector query results, associated data, intermediate query results, query results corresponding to query requests, and the like.

Communication interface 704 may include a transceiver for providing a wired or wireless communication interface for electronic device 700 to communicate with any other suitable device over one or more networks. In some embodiments, communication interface 704 may be integrated with other components of electronic device 700, e.g., communication interface 704 may be integrated in processor 701. In some embodiments, electronic device 700 may communicate with other devices through communication interface 704.

An input/output (I/O) interface 705 may be used to connect input/output devices, such as displays, keyboards, mice, and the like.

Bus 706 is used to provide a suitable access interface for each module of the electronic device.

It will be appreciated that the electronic device 700 may be any electronic device including, but not limited to, a tablet computer, a desktop computer, a server/server cluster, a laptop computer, a handheld computer, a notebook computer, a desktop computer, a super mobile personal computer, a netbook, and the like, and the embodiments of the present disclosure are not limited.

It will be appreciated that the structure of the electronic device 700 shown in the embodiments of the present disclosure does not constitute a specific limitation on the electronic device 700. In other embodiments of the present disclosure, electronic device 700 may include more or less components than illustrated, or may combine certain components, or may split certain components, or may have different component arrangements.

The illustrated components may be implemented in hardware, software, or a combination of software and hardware. The embodiments disclosed herein may be implemented in hardware, software, firmware, or a combination of these implementations. Embodiments of the present disclosure may be implemented as a computer program or program code executing on a programmable system including at least one processor, a storage system (including volatile and non-volatile memory and/or storage elements), at least one input device, and at least one output device.

Program code may be applied to the input instructions to perform the functions described herein and to generate output information. The output information may be applied to one or more output devices in a known manner. For purposes of the present disclosure, a processing system includes any system having a processor such as, for example, DSP (digital signal processor), microcontroller, ASIC (application specific integrated circuit), or microprocessor. The program code may be implemented in a high-level programming language or an object-oriented programming language to communicate with the processing system. The program code may also be implemented in assembly language or machine language, if desired. Indeed, the mechanisms described herein are not limited in scope to any particular programming language. In either case, the language may be a compilation language or an interpretation language.

In some cases, the disclosed embodiments may be implemented in hardware, firmware, software, or any combination thereof. The disclosed embodiments may also be implemented as instructions carried by or stored on one or more temporary or non-temporary machine-readable (e.g., computer-readable) storage media, which may be read and executed by one or more processors. For example, the instructions may be distributed through a network or through other computer-readable media. Thus, a machine-readable medium may include any mechanism for storing or transmitting information in a form readable by a machine (e.g., a computer), including, but not limited to, a floppy disk, an optical disk, an optical disk, a read-only memory (CD-ROMs), a magneto-optical disk, a ROM (read-only memory), RAM (random access memory), EPROM (erasable programmable read-only memory), EEPROM (electrically erasable programmable read-only memory), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features may be shown in a particular arrangement and/or sequence. However, it should be understood that such a particular arrangement and/or ordering may not be required. Rather, in some embodiments, these features may be arranged in a manner and/or sequence different from that shown in the illustrative drawings. In addition, the inclusion of structural or methodical features in a particular figure is not meant to imply that such features are required in all embodiments, and that such features may not be included or may be combined with other features in some embodiments.

It should be noted that each unit/module mentioned in each device embodiment of the present disclosure is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the present disclosure. Furthermore, in order to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It is to be noted that in the embodiments and description of the present disclosure, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one"; does not rule out there are additional identical elements in the process, method, article, or apparatus that includes the element.

While the present disclosure has been illustrated and described with reference to certain preferred embodiments thereof, it will be understood by those of ordinary skill in the art that various changes may be made in form and detail without departing from the scope of the present disclosure.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: A alone; A and B; A, B and C; A, B, C, and D; and so forth. The bounds of an "and/or" list are defined by the complete set of combinations and permutations for the list.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as disclosed above.

The invention claimed is:

1. An apparatus comprising:

a memory for storing instructions; and one or more processor for executing the instructions to perform following process:

receiving a query request;

determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database;

wherein determining associated data of the query request comprises:

determining the one or more question-answering pairs whose similarities to the query request are greater than a first similarity threshold among the plurality of question-answering pairs, and determining the summary information of one or more files whose similarities to the query request are greater than a second similarity threshold among the summary information of the plurality of files;

inputting the query request and the associated data into a large language model so that the large language model outputs an intermediate query result of the query request based on the content of the associated data, wherein the intermediate query result includes answers to questions queried by the query request, the answers are used to solve the questions;

determining a query result of the query request based on the intermediate query result and summary information of the one or more files in the associated data, comprising:

when one or more summary information in the summary information of the one or more files matching the intermediate query result, adding the files corresponding to the one or more summary information to the intermediate query result to obtain the query result of the query request, wherein the query result includes the answers and the files corresponding to the one or more summary information, and the files comprising at least one of audio, video, pictures, and web pages.

2. The apparatus of claim 1, wherein:

determining associated data of the query request, comprising:

determining a first number of question-answering pairs in the plurality of question-answering pairs that associated with a vector corresponding to the query request, and a second number of summary information in summary information of the plurality of files that associated with the vector corresponding to the query request; and determining at least one question-answering pair in the first number of question-answering pairs that satisfies a first condition as the one or more question-answering pair, and the summary information in the second number of summary information that satisfies a second condition as the summary information of one or more files.

3. The apparatus of claim 2, wherein:

the first condition comprising:

a matching degree between the at least one question-answering pair and the query request is greater than a first match degree; and the second condition comprising:

a matching degree between the summary information and the query request is greater than a second matching degree, and/or the information density of the summary information is greater than a preset value.

4. The apparatus of claim 2, wherein:

the summary information of the plurality of files is determined by the following ways:

determining the summary information of text file by extracting summary from text in text file; and determining the summary information of non-text file by extracting summary from text description of the non-text file.

5. The apparatus of claim 1, wherein:

the associated data further comprising at least one historical query request preceding the query request and the query result corresponding to the at least one historical query request.

6. The apparatus of claim 1, wherein:

the large language model comprising any one of the following models: ChatGPT, GPT-1, GPT-2, GPT-3, GPT-4, BERT, and XLNet.

7. The apparatus of claim 1, wherein the files further comprise at least one of tables and documents.

8. A method performed by at least one processor of electronic device, comprising:

receiving a query request;

determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database;

wherein determining associated data of the query request comprises:

determining the one or more question-answering pairs whose similarities to the query request are greater than a first similarity threshold among the plurality of question-answering pairs, and determining the summary information of one or more files whose similarities to the query request are greater than a second similarity threshold among the summary information of the plurality of files;

inputting the query request and the associated data into a large language model so that the large language model outputs an intermediate query result of the query request based on the content of the associated data, wherein the intermediate query result includes answers to questions queried by the query request, the answers are used to solve the questions;

determining a query result of the query request based on the intermediate query result and summary information of the one or more files in the associated data, comprising:

when one or more summary information in the summary information of the one or more files matching the intermediate query result, adding the files corresponding to the one or more summary information to the intermediate query result to obtain the query result of the query request, wherein the query result includes the answers and the files corresponding to the one or more summary information, and the files comprising at least one of audio, video, pictures, and web pages.

9. The method of claim 8, wherein:

the associated data further comprising at least one historical query request preceding the query request and the query result corresponding to the at least one historical query request.

10. The method of claim 8, wherein:

determining associated data of the query request, comprising:

determining a first number of question-answering pairs in the plurality of question-answering pairs that associated with a vector corresponding to the query request, and a second number of summary information in summary information of the plurality of files that associated with the vector corresponding to the query request; and determining at least one question-answering pair in the first number of question-answering pairs that satisfies a first condition as the one or more question-answering pair, and the summary information in the second number of summary information that satisfies a second condition as the summary information of one or more files.

11. The method of claim 8, wherein the files further comprise at least one of tables and documents.

12. A non-transitory computer-readable storage medium having stored thereon instructions that, when executed on an electronic device, cause the electronic device to perform following process:

receiving a query request;

determining associated data of the query request, the associated data including one or more question-answering pairs associated with the query request in a plurality of question-answering pairs, and summary information of one or more files associated with the query request in summary information of a plurality of files, wherein the plurality of question-answering pairs and the summary information of the plurality of files are stored in a vector database;

wherein determining associated data of the query request comprises:

determining the one or more question-answering pairs whose similarities to the query request are greater than a first similarity threshold among the plurality of question-answering pairs, and determining the summary information of one or more files whose similarities to the query request are greater than a second similarity threshold among the summary information of the plurality of files;

inputting the query request and the associated data into a large language model so that the large language model outputs an intermediate query result of the query request based on the content of the associated data, wherein the intermediate query result includes answers to questions queried by the query request, the answers are used to solve the questions;

determining a query result of the query request based on the intermediate query result and summary information of the one or more files in the associated data, comprising:

when one or more summary information in the summary information of the one or more files matching the intermediate query result, adding the files corresponding to the one or more summary information to the intermediate query result to obtain the query result of the query request, wherein the query result includes the answers and the files corresponding to the one or more summary information, and the files comprising at least one of audio, video, pictures, and web pages.

13. The non-transitory computer-readable storage medium of claim 12, wherein:

determining associated data of the query request, comprising:

determining a first number of question-answering pairs in the plurality of question-answering pairs that associated with a vector corresponding to the query request, and a second number of summary information in summary information of the plurality of files that associated with the vector corresponding to the query request; and determining at least one question-answering pair in the first number of question-answering pairs that satisfies a first condition as the one or more question-answering pair, and the summary information in the second number of summary information that satisfies a second condition as the summary information of one or more files.

14. The non-transitory computer-readable storage medium of claim 13, wherein:

the first condition comprising:

a matching degree between the at least one question-answering pair and the query request is greater than a first match degree; and the second condition comprising:

a matching degree between the summary information and the query request is greater than a second matching degree, and/or the information density of the summary information is greater than a preset value.

15. The non-transitory computer-readable storage medium of claim 12, wherein:

the associated data further comprising at least one historical query request preceding the query request and the query result corresponding to the at least one historical query request.

16. The non-transitory computer-readable storage medium of claim 12, wherein:

the large language model comprising any one of the following models: ChatGPT, GPT-1, GPT-2, GPT-3, GPT-4, BERT and XLNet.

17. The non-transitory computer-readable storage medium of claim 12, wherein the files further comprise at least one of tables and documents.

* * * * *